United States Patent [19]

Baker

[11] 4,433,702
[45] Feb. 28, 1984

[54] FULLY OPENING FLAPPER VALVE APPARATUS

[75] Inventor: John R. Baker, Houston, Tex.

[73] Assignee: Baker International Corporation, Orange, Calif.

[21] Appl. No.: 280,039

[22] Filed: Jul. 6, 1981

[51] Int. Cl.³ ............................................. F16K 15/03
[52] U.S. Cl. ................................... 137/527.6; 137/527
[58] Field of Search .................. 137/527, 527.2, 527.4, 137/527.6, 527.8

[56] References Cited

U.S. PATENT DOCUMENTS

| | | | |
|---|---|---|---|
| 474,843 | 5/1892 | Mahan | 137/527.8 X |
| 1,000,719 | 8/1911 | Cram | 137/527 X |
| 1,926,759 | 9/1933 | Wallman | 137/527.8 X |
| 2,162,578 | 5/1937 | Hacker | |
| 3,937,240 | 2/1976 | Nanny | 137/527.8 |
| 4,054,153 | 10/1977 | Guyton | 137/527 |

FOREIGN PATENT DOCUMENTS 2026137 12/1971 Fed. Rep. of Germany ...... 137/527

Primary Examiner—Robert G. Nilson
Attorney, Agent, or Firm—Norvell & Associates

[57] ABSTRACT

An improved flapper valve for installation for example, in a tubing string of a subterranean well is pivotally movable about a horizontal axis into a blocking position relative to the vertical fluid flow path of the tubing string. The flapper valve is circular and is formed from a tubular segment in such a manner that, when in the open position, its concave surface is substantially tangentially coincident with a projection of the cylindrical surface formed by the inside of the valve seat, and its convex surface prescribes a much larger chordal distance in a containing circle concentric with the valve seat than would a flat surface of the same diameter. Thus, a valve is provided wherein for a given housing diameter, the passageway through the valve can be proportionately larger.

2 Claims, 3 Drawing Figures

FULLY OPENING FLAPPER VALVE APPARATUS

BACKGROUND OF THE INVENTION

1. Field of the Invention

The invention relates to a flapper valve having particular utility when employed as a flow control valve in a tubing string for subterranean wells.

2. Description of the Prior Art

Many types of valves have heretofore been proposed for installation in the tubing strings of subterranean wells for interrupting the flow of fluid therethrough. Included in such prior art devices have been flapper valves which are pivotally mounted about a horizontal axis for movement into a blocking position across the vertical bore of the tubing string. Such valves have, however, required either a restriction in the flow path defined by the tubing string or an excessive external enlargement relative to the tubing string to accommodate the pivotal mounting of the flapper valve. Flapper type valves are desirable adjuncts for controlling the flow of fluids in a subterranean well since they are reliable and easily operated, but heretofore, their space requirements have been excessive.

SUMMARY OF THE INVENTION

The invention provides a flapper valve for particular use as flow control valve in a subterranean well wherein an annular valve seat member is provided in surrounding relationship to the normal diameter of the fluid flow bore defined by the production string. The flapper valve embodying this invention is provided with ear-like elements permitting it to be pivotally mounted on a horizontally disposed pin located just outside the extremity of the annular valve seat. The flapper valve in general has the form of a circular segment cut from the wall of a tube where the axis of the segment intersects the axis of the tube at a right angle. The sealing surface of the flapper valve is formed by generating a convex cylindrical surface on the concave side of the circular segment, the center of this cylindrical surface being on the convex side of the segment and its axis being at right angles to the axis of the tube. Thus, because the flapper valve is formed from a part of a circular ring, it conforms better to the circular ring formed by the inner cylindrical surface of a containing housing and the cylindrical surface formed by a projection of the inside of the valve seat. It can, therefor, cover a greater arc and, therefore, have a larger diameter than a flapper valve head with flat inner and outer surfaces. Consequently, the ratio of inner diameter to outer diameter of the flapper valve is maximized.

DESCRIPTION OF THE PREFERRED EMBODIMENT

Figure 1:
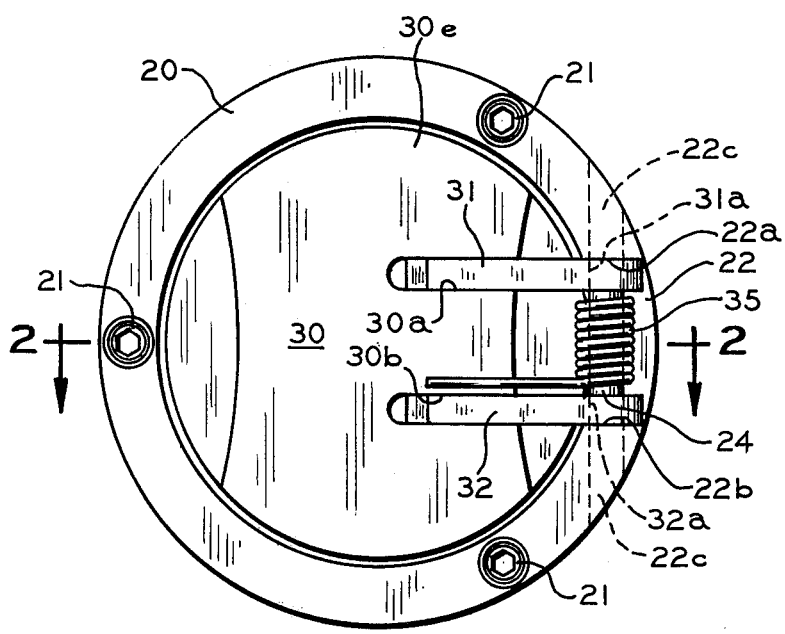
FIG. 1 is a bottom plan view of a flapper valve embodying this invention with the flapper valve being disposed in its closed position.

The flapper valve embodying this invention comprises an assemblage of three main components, respectively, a valve seat sleeve 10, a hinge pin clevis ring 20 and a flapper valve 30. The valve seat sleeve 10 defines a bore 10a and an external cylindrical surface 10b. The lower end portion 11 of the valve seat sleeve 10 is of reduced diameter and defines at its bottom end a fixed, annular, concave, generally cylindrical valve seating surface 11a. Valve seating surface 11a is generated by a cylinder having an axis perpendicular to and passing through the axis of the flow bore. In a typical well installation, surface 11a would be facing downwardly.

The hinge pin clevis ring 20 has an internal surface 20a which snugly engages the external periphery of the reduced diameter portion 11 of the valve seat sleeve 10. Clevis ring 20 is secured to valve seat ring 10 by a plurality of peripherally spaced bolts 21 which pass through suitable vertical holes provided in the clevis ring 20 and threadably engage the main body portion of the valve seat ring 10. At one point around the clevis ring 20, the ring is cut away to form a generally radially extending slot 22 having vertical side surfaces 22a and 22b. On either side of slot 22, are coaxial holes 22c through surfaces 22a and 22b. The valve head pivoting means includes a pivot mounting pin 24 transversing slot 22, and having its ends retained in holes 22c. The axis of pivot pin 24 is parallel to the axis of a cylinder that would contact all the elements of the annular seating surface 11a. The pivoting means does not, however, overlay seating surface 11a and is confined to the exterior of this surface.

The flapper valve element 30, as shown in FIG. 1, is of generally circular configuration. A pair of parallel ears 31 and 32 are respectively inserted in suitable slots 30a and 30b provided in the bottom face of the flapper valve element 30. The outer extremities of ears 31 and 32 snugly abut vertical surfaces 22a and 22b provided on the hinge pin clevis ring 20 and hinge pin 24 passes through suitable apertures 31a and 32a respectively provided in the ears 31 and 32. Ears 31 and 32 are secured to the flapper valve element 30 in any conventional manner, for example, by welding.

Figure 2:
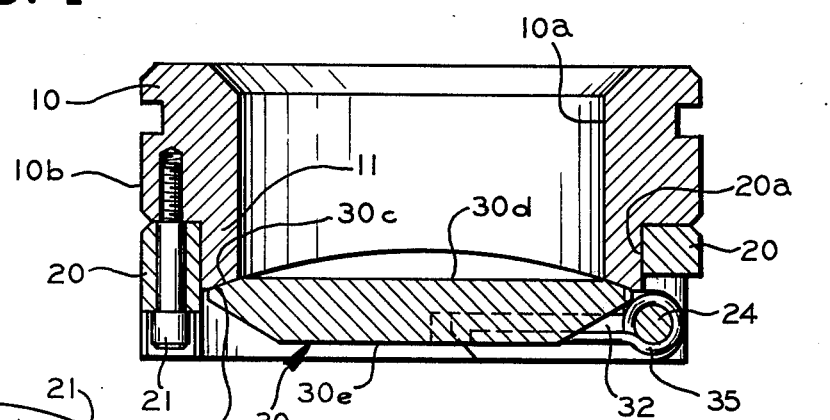
FIG. 2 is an inverted sectional view taken on the plane 2—2 of FIG. 1.

Lastly, a torsion spring 35 of conventional configuration is wrapped around pin 24 and has its opposite ends respectively engaging the hinge pin clevis ring 20 and the flapper valve element 30 to exert a torsional bias on the flapper valve element 30 urging it to the closed position illustrated in FIGS. 1 and 2, wherein an annular cylindrical, convex sealing surface or means 30c formed on the periphery of flapper valve element 30 engages the annular valve seat 11a of the valve seat ring 10 in sealing relationship.

Figure 3:
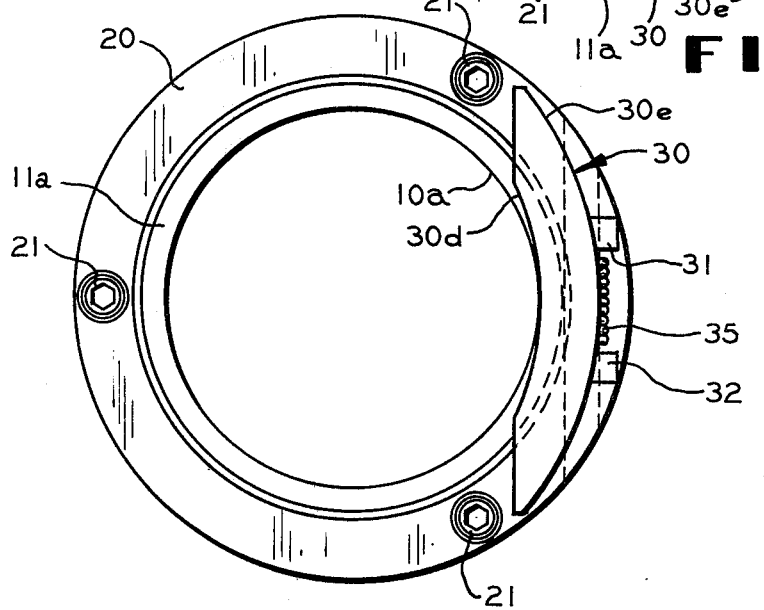
FIG. 3 is a bottom plan view similar to FIG. 1 but showing the flapper valve in its open position.

Referring particularly to FIG. 3, it will be observed that the flapper valve element 30 is actually formed from a segment of a circular ring cross-section, as viewed in a horizontal plane when the valve is open. This circular segment comprises a circular section from the wall of a tubular member extending perpendicular to the axis of the tubular member. Thus, the upper face 30d of flapper valve element 30 is of concave configuration and of a radius somewhat larger than that of the bore 10a of the valve seat sleeve 10, so that when the flapper valve element 30 is moved about 90° to its open position, illustrated in FIG. 3, it in no manner restricts the bore 10a. Similarly, the external surface 30e of flapper valve element 30 is of convex configuration to provide thickness for adequate structural strength at the center of the valve. The convex and concave surfaces of flapper valve head 30 then correspond to the outer and inner tubular surfaces of the tubular wall of a cylindrical member from which the flapper valve head is formed.

The inner and outer tubular surfaces may have been generated along a common axis or by two separate, but parallel, axes. If formed by a common axes, the inner and outer surfaces would be concentric. If formed by separate inner and outer tubular axes, the inner and outer surfaces could be eccentric. If formed by separate inner and outer tubular axes, a plane intersecting these axes will divide the circular section or segment into substantially equal and opposing half-sections.

It is, therefore, apparent that the described flapper valve construction provides a simple, economical valving arrangement for controlling fluid flow in a subterranean well while, at the same time, not unduly restricting or impairing the fluid flow passage when the valve is in the open position. The configuration of the flapper valve itself is such that the ratio of the inner diameter of the valve seat, unrestricted by the flapper, to the outer diameter of the valve seal ring 10 can be greater than could be achieved with a conventional flapper valve. When in the fully opened position, the maximum cross-sectional area of the flapper valve head projected in a plane perpendicular to the bore of the flapper valve would be bounded by the surface defined by the inner diameter of the valve seat to the outer diameter of the valve seat ring.

While there are many applications in the oil well field for the heretofore described flapper valve, it is particularly well suited to function as a blocking valve in a block and kill valve apparatus of the type described and claimed in my co-pending application Ser. No. 280,592, filed July 6, 1981, and entitled "Block And Kill Valve Apparatus And Method Of Killing A Subterranean Well Using Same", the disclosure of which is herein incorporated by reference. Reference should be had to such co-pending application for information concerning the mounting of the flapper valve relative to a tubing string. Also described therein is a sleeve type actuator for holding the flapper valve in its open position which cooperates with the concave top face of the valve element 30.

Although the invention has been described in terms of a specified embodiment which is set forth in detail, it should be understood that this is by illustration only and that the invention is not necessarily limited thereto, since alternative embodiments will become apparent to those skilled in the art in view of the disclosure. Accordingly, modifications are contemplated which can be made without departing from the spirit of the described invention.

What is claimed and desired to be secured by Letters Patent is:

1. A flapper valve for incorporation within a tubular conduit of a subterranean well, comprising: an annular valve seat sleeve surrounding a fluid flow bore therethrough and having a fixed annular concave seating surface defined on said annular sleeve by the intersection of a cylindrical surface having an axis perpendicular to and passing through the axis of the flow bore and valve seat sleeve; valve head pivoting means having an axis exterior of said seating surface; a flapper valve head having the configuration of a circular section of a tubular wall, the axis of the circular section being perpendicular to the tubular wall, said tubular wall having inner and outer tubular surfaces having inner and outer tubular axes, respectively, each tubular axis being perpendicular to the axis through the flow bore of said seating surface when said valve head is manipulated to the closed position relative to the seating surface, the inner and outer tubular axes being parallel to said axis through the flow bore when said flapper valve head is manipulated to the open position relative to said seating surface; and convex sealing means positioned on said valve head between said inner and outer tubular surfaces for sealing contact with said seating sruface when said valve head is in the closed position, said sealing means having an annular surface having substantially the same effective diameter as the effective diameter of the seating surface.

2. The valve of claim 1 wherein said inner and outer tubular axes comprise a common axis, said inner and outer tubular surfaces being concentric.

* * * * *